Aug. 24, 1948.          C. H. CRAWLEY           2,447,900
                         HOSE COUPLING
                       Filed June 27, 1944

INVENTOR.
CHARLES H. CRAWLEY
BY
ATTORNEYS

Patented Aug. 24, 1948

2,447,900

UNITED STATES PATENT OFFICE 2,447,900

HOSE COUPLING

Charles H. Crawley, Cleveland, Ohio, assignor to The Weatherhead Company, Cleveland, Ohio, a corporation of Ohio Application June 27, 1944, Serial No. 542,283

9 Claims. (Cl. 285—75)

This invention relates to hose and fittings or hose couplings of the quick attachable or reusable type and to a method of making same.

It is among the objects of my invention to provide a hose coupling that is quickly and easily attachable and detachable to and from a hose end and will resist leakage and blow-off or other failure through a wide range of pressures, temperatures and other conditions of service; that will be fool-proof in its operation and use and proof against loss of parts during replacement and repair; that will resist depreciation and loss of efficiency due to ageing and "cold flow" of the material of the hose; and that will be efficient in its operation and economical as to manufacturing costs and saving of time and material in manufacture and use. Other objects include the provision of a method of making a hose coupling having the above mentioned desirable characteristics and of making the same efficiently and economically of time and material.

Figure 1:
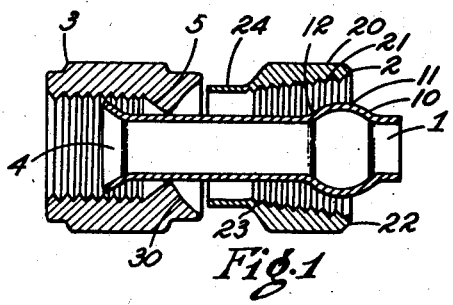
Figure 2:
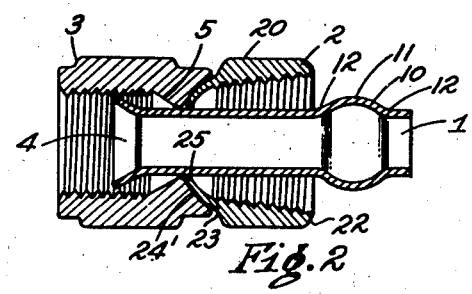
Figure 3:
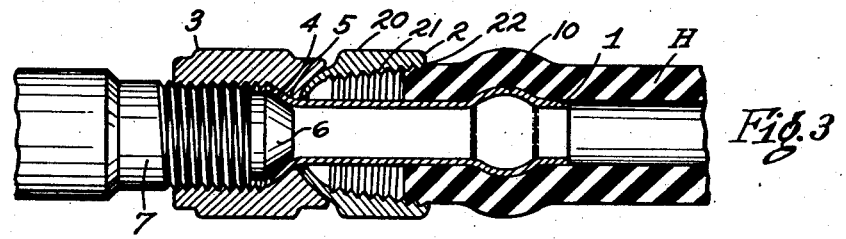
Figure 4:
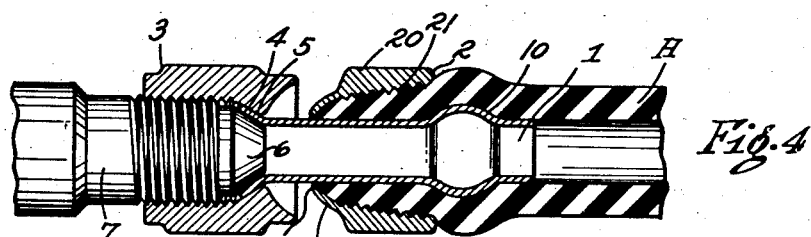
Figures 5, 6:
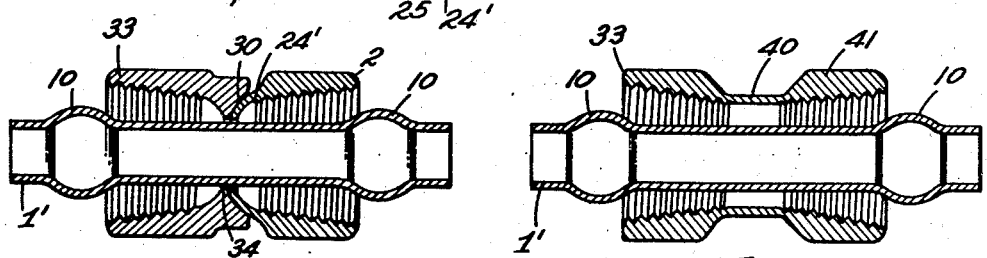
Figure 7:
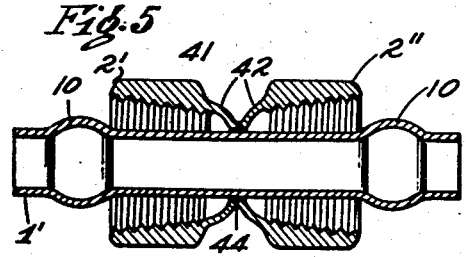

The foregoing and other objects will appear from the following description of certain preferred forms and embodiments of my invention, reference being had to the accompanying drawings in which Figure 1 is a longitudinal section of the parts positioned preliminarily to final assembly thereof; Figure 2 is a similar view showing the same parts in the position of final assembly as a fitting or coupling entity; Figure 3 is a longitudinal section of the fitting or coupling parts in a preferred position in the preliminary step of connecting the hose to be coupled thereto; Figure 4 is a similar section showing this form of coupling in assembled relation with the hose at one end and a different instrumentality at the other end; Figure 5 is a longitudinal section of a modified form of my invention in the form adapted to receive hose ends at both ends of the coupling; Figure 6 is a longitudinal section showing another modification of my invention with the parts in a preliminary position prior to the assembly thereof, and Figure 7 is a view similar to that of Figure 6 of the same form of my invention showing a second step in the operation of assembling the parts.

Referring first to the form of my invention illustrated in Figs. 1 to 4, the coupling comprises an inner tubular member or nipple 1 upon which, when the parts are finally assembled as shown in Figure 2, are slideably and rotatably secured a hose nut 2 and a tube nut 3. In this form of my invention the nipple which has the end within the tube nut 3 is enlarged by being flared outwardly as at 4 so that it may be gripped between the internal conical surface 5 of the nut 3 and the external conical surface 6 of an external instrumentality or fitting 7, see Figs. 3 and 4, to form a joint. The form of the flare 4 or other enlargement of this end of the nipple bears on the precepts of the instant invention in retaining the tube nut 3 in assembled relation with the nipple and the hose nut, see Figure 2, on one hand, and bears on the precepts of the instant invention in that the flare or other enlargement at this end of the nipple taken with the enlargement 10 at the other end of the nipple is a limiting and controlling factor in respect to the length of the nipple and the length between the enlarged portions thereof. One of my purposes is to conserve the length of the nipple part of the coupling.

The other end of the nipple, the right end as viewed in the drawings, has an enlarged portion 10 of substantially spherical exterior contour 11 merging smoothly into the exterior cylindrical surface of the nipple as at 12. The radius of the spherical surface 11 is materially greater than the radius of the exterior cylindrical surface of the straight parts of the nipple and may be from 20% to 80% greater depending upon the size of the nipple and the relation of the wall thickness of the hose to be coupled to the diameter thereof. Generally speaking where the coupling is to be attached to a hose of smaller interior diameter with a relatively large wall thickness, the radius of the surface 11 will be proportionately greater than the radius of the cylindrical part of the nipple as compared with the relation where the hose is of larger interior diameter and relatively lesser wall thickness. Specifically I have found it desirable to make the diameter of the spherical surface 11 about 50% greater than the outside diameter of the cylindrical inner part of the nipple where the latter is about ⅛" and where the wall thickness of the hose to be coupled is between about 1/16" and ⅛". Where the outside diameter of the cylindrical part of the nipple is ½" I have found it satisfactory to make the surface 11 of a diameter of about 5/8", i. e., about 20% greater than the diameter of the cylindrical part of the nipple where the wall thickness of the hose is about ⅛". The relation of the size and extent of the enlargement 10 to the outside diameter of the cylindrical part of the nipple and to the hose to be coupled in its co-action with the hose nut 2 will more fully appear in connection with the description of the hose nut 2 in its relation to the other parts of the coupling.

As shown in Figs. 3 and 4 the inner converging surfaces of the hose nut are so juxtaposed to the opposite surfaces of the cylindrical part of the nipple and the adjacent part of the expanding surface 11 of the enlargement 10 as to form roughly a trapezoidal area that is progressively reduced in size as the nut advances over and grips the end of the hose.

The hose nut 2 preferably has a non-circular or other easily gripped exterior surface 20 and internal tapered threads 21 which decrease in diameter from a maximum at the open end 22 of the nut 2, preferably on a slope of about 7 degrees to the axis of the nut, to a minimum at a point 23 spaced from the inner "closed" end of the nut. The tapered threads 21 are preferably wide angled, as of about 90 degrees for example, with flattened tops whereby to eliminate or reduce the tendency of the threads to cut injuriously the outer surface of the hose while still being sharp enough to engage the outer surface of the hose firmly and induce a substantially true screwing action between the nut and the outer surface of the hose as the former is advanced thereover as from the position shown in Figure 3 to the position shown in Figure 4.

Preferably the nut 2 is formed in the first instance with an integral cylindrical extension or tail piece in the form of a thin walled straight cylindrical portion 24 extending rearwardly of the thicker body portion of the nut as shown in Figure 1. Prior to cutting or forming the tapered threads 21, the inner surface of the tail piece 24 is truly cylindrical and extends to a junction with a smooth tapered inner surface of the body of the nut in which the tapered threads are cut. When the tapered threads 21 are cut in the body portion of the nut 2 the threads will run out at about the point 23 where the tap departs from and clears the smooth cylindrical inner surface of the tail piece 24. Thus the threaded portion of the nut 2 tends to merge smoothly into the smooth inner unthreaded surface of the tail piece 24 thereof.

To assemble the parts that comprise the entity of the coupling in Figure 2 I prefer to form the inward end of the tube nut 3 with an inwardly inclined concave surface 30 which may be substantially conical or spherical in form. I utilize this surface as a die into which the tail piece 24 is forced by forcible movement of the hose nut 2 from right to left as viewed in Figures 1 and 2 while the tube nut 3 is held immovable. Under the influence of such forcible motion the tail piece 24 is driven into and constricted within the contour of the surface 30 until it assumes the shape substantially as shown in Figure 2 corresponding to the surface 30 whether conical or more or less spherical, taking the form shown at 24' as shown in Figures 2, 3 and 4. When the tail piece has been altered from the cylindrical form 24 shown in Fig. 1 to the spherical or conical form 24' in Fig. 2, whether by being crimped in the die surface 30 or by spinning or otherwise, its inner constricted edge 25 will lie closely adjacent the outer surface of the cylindrical part of the nipple and will be of a diameter smaller than the diameter of the enlargement 10 so that it will be retained in assembled relation on the nipple and with the tube nut 3 for all future use. As shown in Figures 1 and 2 the minimum diameter of the tube nut 3 adjacent the point of convergence of the surfaces 5 and 30 is smaller than the maximum diameter of the enlargement 10 and the flared end 4 of the nipple. In this form it is assumed that the tube nut has been associated with the nipple prior to the making of one or the other of these enlargements. This is practicable since the presence of the tube nut alone upon the nipple leaves room to grip the nipple while forming the enlargement 10 for example. It is feasible and not without my teachings to form both the enlargements on the nipple before placing the tube nut thereupon especially where the enlargement 10 not greatly in excess of the outside diameter of the nipple so that minimum diameter of the tube nut adjacent the converging surfaces 5 and 30 may be a little greater than the diameter of the surface 11. Assuming that the flare 4, or equivalent enlargement of the nipple with which the surface 5 of the tube nut cooperates, prevents the removal of the tube nut thereover, then when the tail piece 24' of the hose nut is constricted so that its minimum constricted diameter 25 is less than the diameter of the surface 11 the parts will by this combination be retained in assembled relation. It will be appreciated that the minimum diameter of the tube nut adjacent the converging surfaces 5 and 30 need not necessarily closely approach the outside diameter of the smooth cylindrical part of the nipple to permit the surface 30 to function satisfactorily as a die to constrict the extreme inner end of the tail piece 24'. I prefer however that whether the tail piece 24 be crimped inwardly by co-action with the surface 30 of the tube nut, or be spun inwardly by a separate spinning operation when the parts are in the relation shown in Figure 1 that the inner edge 25 of the piece 24' be closely proximate to the outer cylindrical surface of the nipple while being freely moveable with respect thereto. In this way substantially the whole axial as well as radial surface of the end of the hose H is engaged and contained by the hose nut 2 when the parts are screwed together as shown in Figure 4. This substantial complete encompassment and forcible contact with the whole end of the hose mitigates against impairment of the utility of the connection which might otherwise come about due to "cold-flow of the rubber or rubberlike material of the hose, and this encompassment and forcible contact axially and radially upon the radial and circumferential surfaces of the hose end by the hose nut from its closed end about the opening 25 around to the open end of the hose nut gives a greatly improved seal and improved resistance to leakage or "blow-off."

It will be understood that the hose H to be coupled is characterized by the elasticity or stretchability of its walls, what the trade now commonly calls "low pressure" hose, as distinguished more or less from the more heavily reenforced or wire reenforced hoses or flexible tubes that are substantially nonextensible radially. Such hoses with stretchable walls are commonly made of rubber or rubber like material, but I contemplate using my coupling with hoses of any kind of material that is otherwise adaptable to the precepts of my invention.

After the parts are formed and assembled as shown in Figure 2 it is preferable that the tube nut first be screwed into engagement with an external instrumentality 7, gripping the flared end 4 of the nipple as shown in Figure 3, to make it a little more convenient to handle the parts for the step of assembling the hose with the other end of the nipple and the hose nut. The nipple is then preferably lubricated adjacent the enlarged portion 10, and the end of the nipple with its enlarged portion is inserted into the hose, preferably by a combination of manually exerted forces and motions longitudinally and torsionally to aid the enlarged portion of the nipple to enter the hose while stretching the hose wall over the enlargement 10. As the end of the hose H contacts the open end of the hose nut 2 it is desirable to effect a relative twisting and screwing motion between the hose nut 2 and the hose H, the hose nut being in its position of greatest retraction on the nipple 1 as shown in Figure 3, and inducing the hose to enter the threads of the open end of the hose nut substantially as shown in Figure 3. The maximum diameter of the tapered threads 21 being so related to the maximum outside diameter of the surface of the hose H as to receive with little effort a short portion thereof that has passed over and inwardly beyond the enlargement 10 of the nipple.

In carrying out my object of keeping the nipple as short as possible it will be seen that the distance between the flared end 4 of the nipple and the enlargement 10 need be only long enough to accommodate the inner end of the tube nut 3, the length of the hose end which is forced over the enlargement 10 and not freely or initially received within the open end of the hose nut. After the parts have been partially assembled to the state shown in Figure 3 preferably by manual handling thereof as above described, then the tube nut 2 is forcibly threaded from left to right as viewed in Figures 3 and 4 as by the use of a wrench on the hose nut while the hose H is held against rotation as in the hand of the person making the assembly. The tapered threads of the hose nut having an initial grip as shown in Figure 3 advance over the outer surface of the hose forcing the part of the hose therein contained to a longitudinal extension leftwardly, compare Figures 3 and 4, and into a radial compression and contraction as shown in the same figures until the end of the hose substantially fills all of the space within the hose nut and is squeezed axially by the inturned end 24'. Thereupon when the parts are proportioned as I prefer they be, and as illustrated particularly in Figure 4, the open end of the tube nut will have approached but not yet reached the point of maximum enlargement of the enlargement 10 of the nipple and the hose wall adjacent thereto. When the assembly has thus been completed as shown in Figure 4 the inner surface of the hose is forcibly compressed against the adjacent outer cylindrical surface of the nipple as well as against the leftward spherical surface of the enlargement 10 as viewed in Figure 4, and the nipple is in fluid tight engagement with inner surface of the hose. As fluid pressure is built up within the hose the tendency of the hose to "blow-off" from the nipple brings about forces which tend to draw hose rightwardly, as viewed in Figure 4, whilst drawing the nipple leftwardly, all of which forces a firmer grip between the hose nut, the hose and the nipple leftwardly of the point of maximum diameter of the enlargement 10 thereby more firmly sealing the hose upon the nipple. When the hose nut 2 is in the first instance substantially completely filled with the material of the wall of the hose, as shown in Figure 4, substantially all of the forces resulting from the fluid pressure in the hose and coupling is converted into fluid sealing and mechanical gripping reactions, and is not dissipated in relative movement of the parts or flow of the material of the hose wall.

In Figure 5 I have shown a modified form of my invention provided for the purpose of gripping different hose ends on opposite ends of the nipple 1'. In this form the nipple is provided with enlargements 10, above described, adjacent both its ends, and the hose nut 2 may be substantially identical with the hose nut 2 as illustrated in Figures 1 to 4 inclusive, and may have its end or tail piece 24' similarly formed, that is by coaction with the concave surface 30 substantially the same as the surface 30 of the tube nut 3 above described. In this instance however the leftward nut 33 is formed internally to have an internal threading and configuration substantially identical with the internal configuration of the nut 2 whereby to co-act with the hose end in the same way as the nut 2 co-acts with the hose end. The nut 33 differs from the nut 2 essentially in the structure containing the surface 30 for the purposes and uses above described. In this instance the minimum internal diameter of the nut 33 at the point 34 adjacent the inner terminus of the surface 30 will be made smaller than the maximum diameter of the enlargements 10, and the nut 33 will be placed over the nipple 1' preferably after forming the leftward enlargement 10 as viewed in Figure 5 but prior to the forming of the rightward enlargement 10. It will be seen that the nut 33 may be moved to its extreme leftward position with the minimum opening 34 adjacent to the leftward enlargement leaving a substantially great straight length of nipple to be gripped by external agencies during the operation of forming the right enlargement 10 of the nipple 1'. Thereafter a nut 2 in the form shown in Figure 1 may be passed over the right enlargement of the nipple, and its tail piece 24' given its finished form as by forcible entry into the surface 30 of the nut 33 for final assembly of the parts comprising the finished coupling.

In Figures 6 and 7 I have shown a further modification of my invention wherein the nipple 1' may be substantially the same as the nipple 1' in Figure 5 and in which both the hose nuts are first made in one piece being joined by a cylindrical portion of reduced thickness and reduced diameter as at 40 which contains the equivalent of two tail pieces 24 of the nut 2, as shown in Figure 1. Here the combined nuts 41 may each be formed with internally tapered threads running out in the thin cylindrical portion 40 and comprises substantial duplicates of the nuts 2, above described, attached through the part 40. The parts being in the relation shown in Figure 6, the part 40 may be spun or crimped inwardly at at 42, Figure 7, duplicating the form of the inturned tail piece 24' and duplicating the form of the nuts 2 rightwardly and leftwardly as viewed in Figure 7. After the portion 40 has been inturned as shown in Figure 7, by the appropriate spinning or crimping operation the whole piece 41 may be severed in its middle reduced part as at 44 providing right and left hose nuts 2' and 2'' each substantially identical with the hose nut 2, first above described. The innermost diameter of the tail pieces 42 of the nuts 2' and 2'' will be less than the outside diameter of enlarged portions 10 of the nipple 1', and will be retained in assembled relation thereby, and will co-act with the hose ends to be applied thereto substantially in the manner described with reference to Figures 3 and 4.

While I have illustrated and described preferred forms of my invention both as an article of manufacture and in respect to the method of making the same, changes, modifications and improvements will occur to those skilled in the art without departing from the major precepts thereof, and I do not care to be limited in the scope of my patent to the particular forms herein specifically illustrated and described nor in any manner other than by the claims appended hereto.

I claim:

1. A hose coupling comprising in combination a nipple having a substantially spherically shaped enlargement adjacent the end thereof adapted to enter the hose end to be coupled, and a hose engaging nut having an internally tapered threaded part with an open end into which the hose may enter, an apertured closed end freely and closely engaging the nipple remote from said enlargement, said closed end sloping toward and paralleling said enlargement and joining said internally tapered threaded part, said internally tapered threaded part having threads of minimum pitch diameter adjacent said closed end and of maximum pitch diameter adjacent said open end, said maximum pitch diameter being substantially smaller than the external diameter of the hose at its point of greatest enlargement adjacent the enlargement of said nipple when the hose is coupled.

2. A hose coupling comprising in combination a nipple having a substantially spherically shaped enlargement adjacent the end thereof adapted to enter the hose end to be coupled, and a hose engaging nut having an internally tapered threaded part with an open end into which the hose may enter, an apertured closed end freely and closely engaging the nipple remote from said enlargement, said closed end sloping toward and paralleling said enlargement and joining said internally tapered threaded part, said internally tapered threaded part having threads of minimum pitch diameter adjacent said closed end and of maximum pitch diameter adjacent said open end, said maximum pitch diameter being substantially smaller than the external diameter of the hose at its point of greatest enlargement adjacent the enlargement of said nipple when the hose is coupled, and said threaded part merging into the sloping wall of the closed end of the nut smoothly with threads of diminishing depth.

3. A hose coupling comprising a nipple having enlargements at both ends, a pair of nuts on said nipple each having portions of internal diameter smaller than the enlargement of the nipple adjacent thereto, one of said nuts having a portion facing the other of said nuts with a convex surface comprising a crimping die adapted to crimp and constrict a juxtaposed portion of the other of said nuts from an internal diameter larger than the enlargement of the nipple adjacent thereto to an internal diameter smaller than said enlargement and into a close but free fit with the nipple.

4. A hose coupling comprising a nipple having enlargements at both ends, a pair of nuts on said nipple each having portions of internal diameter smaller than the enlargements of the nipple adjacent thereto preventing removal thereover, said nuts having parts facing each other by the coaction of which when the nuts are disposed on said nipple at least one of said parts is reduced to a diameter smaller than the adjacent enlargement.

5. In a tube and hose coupling the combination of a nipple having a flared end to coact with a tube fitting and an enlarged end to enter a hose to be coupled, a tube nut coacting with said flared end and having a minimum aperture smaller than said flared end, and a hose nut disposed on said nipple between said tube nut and said enlarged end having a minimum aperture smaller than said enlarged end.

6. The method of assembling a pair of hose nuts onto a nipple having enlarged ends, which consists in forming said nuts with a common cylindrical connecting portion, disposing said nipple therein with its enlarged ends oppositely spaced from the connecting portion of said nuts, constricting the connecting portion of said nut to a diameter smaller than said enlarged ends, and severing said constricted portion.

7. The method of assembling a hose coupling comprised of a nipple with enlarged ends and two nuts each adapted to coact with one of said enlarged ends and having apertures respectively smaller than said ends by virtue of which the parts are irremovably secured together, which consists in forming a concave die surface in the end of one of said nuts juxtaposed to the end of other of said nuts, forming the other nut with a contractible end portion juxtaposed to said surface, forming an enlargement on one end of said nipple disposing said one nut on said nipple, slipping said other nut over said enlargement and contracting the end of said other nut by forcible movement into said die surface so that said contractable portion has a sliding fit with an unenlarged nipple portion.

8. The method of assembling a hose coupling comprised of a nipple with enlarged ends and two nuts each adapted to coact with one of said enlarged ends and each having apertures respectively smaller than said ends by virtue of which the parts are irremovably secured together, which consists in enlarging one of the ends of the nipple, forming one of said nuts with a smaller aperture than said enlargement, passing the other end of the nipple through said aperture, enlarging the other end of the nipple, forming the other nut with a contractible aperture larger than the second enlargement of the nipple, passing said nut over said second enlargement and thereafter constricting the aperture in said other nut.

9. The method of securing and retaining a nut on a nipple having an enlarged portion with which said nut coacts to serve as a coupling, said nipple having a member associated therewith spaced from said enlarged portion with a concave die surface facing said enlarged portion, which consists in forming said nut with a greater minimum internal diameter than said enlarged portion and with a deformable end part, passing said nut over the enlarged part of said nipple, and forcibly moving the deformable end thereto into said die surface and constructing the same to an internal diameter smaller than said enlarged part of said nipple.

CHARLES H. CRAWLEY.

REFERENCES CITED

The following references are of record in the file of this patent:

UNITED STATES PATENTS

| Number | Name | Date |
|---|---|---|
| 998,587 | Mueller | July 18, 1911 |
| 1,468,601 | Loughead | Sept. 18, 1923 |
| 1,951,860 | Cowles | Mar. 20, 1934 |
| 2,144,117 | Miller | Jan. 17, 1939 |
| 2,171,945 | Norgren | Sept. 5, 1939 |

FOREIGN PATENTS

| Number | Country | Date |
|---|---|---|
| 705,651 | France | June 11, 1931 |
| 728,404 | France | Apr. 12, 1932 |

Certificate of Correction

Patent No. 2,447,900. August 24, 1948.

CHARLES H. CRAWLEY

It is hereby certified that errors appear in the printed specification of the above numbered patent requiring correction as follows: Column 1, line 1, for the word "and" after "hose" read *end*; column 4, line 36, for "due to "cold-flow of" read *due to "cold-flow" of*; column 6, line 46, for "at at 42" read *as at 42*, column 8, line 53, claim 9, for "thereto" read *thereof*; and that the said Letters Patent should be read with these corrections therein that the same may conform to the record of the case in the Patent Office.

Signed and sealed this 30th day of November, A. D. 1948.

[SEAL]

THOMAS F. MURPHY,
*Assistant Commissioner of Patents.*